United States Patent [19]

Kneip et al.

[11] 4,392,176
[45] Jul. 5, 1983

[54] SELF-CHECKING SAFETY MAT

[75] Inventors: Fernand Kneip, Diekirch; Ernest Marnach, Colmar-Berg, both of Luxembourg

[73] Assignee: The Goodyear Tire & Rubber Company, Akron, Ohio

[21] Appl. No.: 332,930

[22] Filed: Dec. 21, 1981

[51] Int. Cl.$^3$ ............................................. H01H 47/22
[52] U.S. Cl. ............................. 361/160; 192/129 A; 361/189
[58] Field of Search ........................ 361/160, 189, 191; 192/129 A; 340/573; 307/140, 141.8

[56] References Cited

U.S. PATENT DOCUMENTS 3,827,040  7/1974  Simmons ................... 192/129 A X

*Primary Examiner*—Harry E. Moose, Jr.
*Attorney, Agent, or Firm*—F. K. Lacher; T. P. Lewandowski

[57] ABSTRACT

A safety mat for a power driven machine which stops or prevents operation of the machine when a person is standing on the mat. The mat has at least one supporting plate held in an unloaded position by springs and actuating at least two limit switches when depressed as by a person stepping on the mat. The limit switches are part of a safety circuit interlocking a main circuit for disabling operation of the machine when at least one of the switches is actuated. The switches selectively energize relays having contacts which energize an output relay for opening or closing the circuit to be opened for safety reasons on the machine. The relays also have contacts which energize a timer relay when the safety mat is depressed as by a person stepping on the mat. The timer relay energizes a timer switch and this provides a self-checking function whereby if there is a defective component in the system the timer relay will not be energized and the main circuit will remain disabled.

8 Claims, 3 Drawing Figures

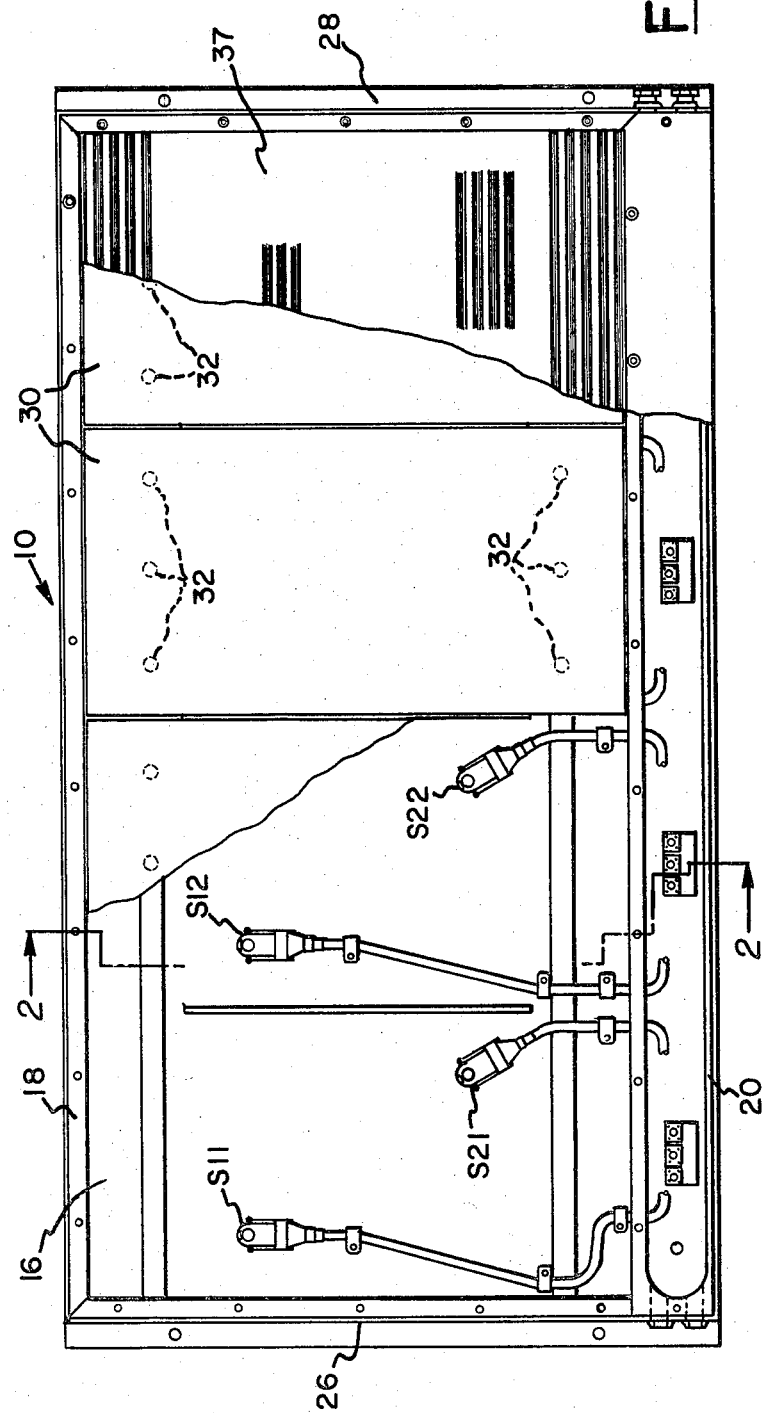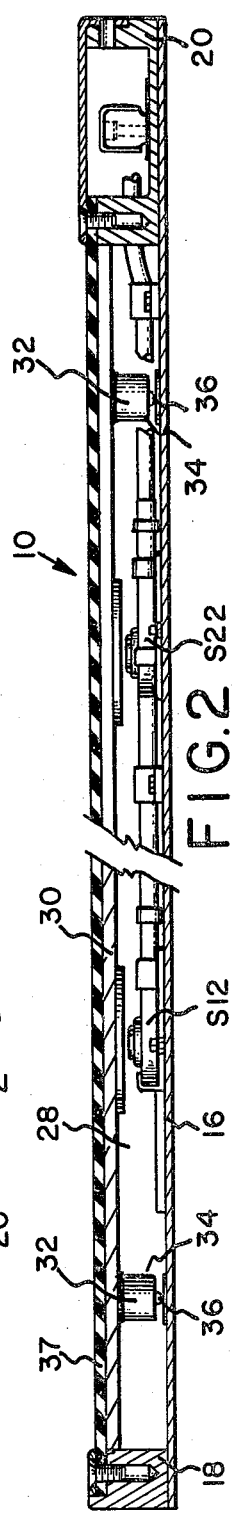

SELF-CHECKING SAFETY MAT

This invention relates generally as indicated to a safety mat for positioning adjacent a power driven machine in areas where it is unsafe for personnel during operation of the machine. This is especially needed when the operator must work in those areas when the machine is stopped as during the building of tires on a tire building machine. Pneumatic type mats have been found to be unsatisfactory because the response to the operator stepping off the mat has been slow and this has resulted in the loss of valuable machine time in each building cycle. Pneumatic mats have also been vulnerable to damage from dropped tools and use of other machine maintenance equipment.

Most safety mat designs have been directed to stopping or preventing operation of a machine when the operator steps off the mat and not to the problem of stopping or preventing operation when a person is standing on the mat. Another safety mat requirement is the providing of redundancy so that if a component fails the system is still operational. Where redundancy has been built in it is then essential that there is a self-checking function to indicate if a component has failed.

It is an object of this invention to provide a safety mat which will stop or prevent operation of a machine when a person steps on the mat.

It is another object to provide a redundant system so that if one component fails the safety system will still function.

A further object is to provide a self-checking capability to determine if any component of the system has failed.

A still further object is to provide a safety mat of durable construction and having a rapid response to movement of personnel on and off the mat.

It is therefore an aspect of this invention to provide a safety mat for a power driven machine comprising a supproting plate, yieldable means for supporting the plate at a predetermined level in the unloaded condition and permitting depression of the plate when supporting a person; a main circuit for the machine, safety means interlocked with the main circuit disabling operation of the machine if a person is standing on the mat, self-checking means included in the safety means for interrupting the main circuit to prevent operation of the machine when the safety means is defective; the safety means including a switch means activated in response to movement of the supporting plate between unloaded and depressed positions, the switch means being connected to a first relay and a second relay; the first relay being energized when the plate is in the unloaded condition and the second relay being energized when the plate is depressed as by a person standing on the mat; the first relay and the second relay having first contacts which are closed to energize an output relay when the plate is unloaded and which are open to de-energize the output relay when the plate is depressed and the outuput relay having an output contact in the main circuit for enabling the circuit upon energization of the output relay and disabling the circuit upon de-energization of the output relay; the first relay and the second relay having second contacts which are closed to energize a timer relay for actuating a timer switch when the plate is depressed to provide the self-checking means; wherein prior to starting the machine the timer relay is energized in response to depression of the plate and the timer switch is closed and held in a closed position for a predetermined time interval if a component of the safety means is not defective so that upon return of the plate to the unloaded position there will be energization of the first relay and de-energization of the second relay causing the output relay to be energized and the output contact closed to enable the main circuit so that the machine may be operated and wherein prior to starting the machine the timer relay will not be energized in response to depression of the plate if a component of the safety means is defective so that the timer switch will not be closed preventing energization of the output relay and closing of the output contact so that operation of the machine is prevented.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 1 is a plan view of a safety mat with parts being broken away to show the rubber cover, the separate metal plates, the limit switches and base plate assembly.

FIG. 2 is a sectional view taken along the lines 2—2 of FIG. 1.

Figure 3:
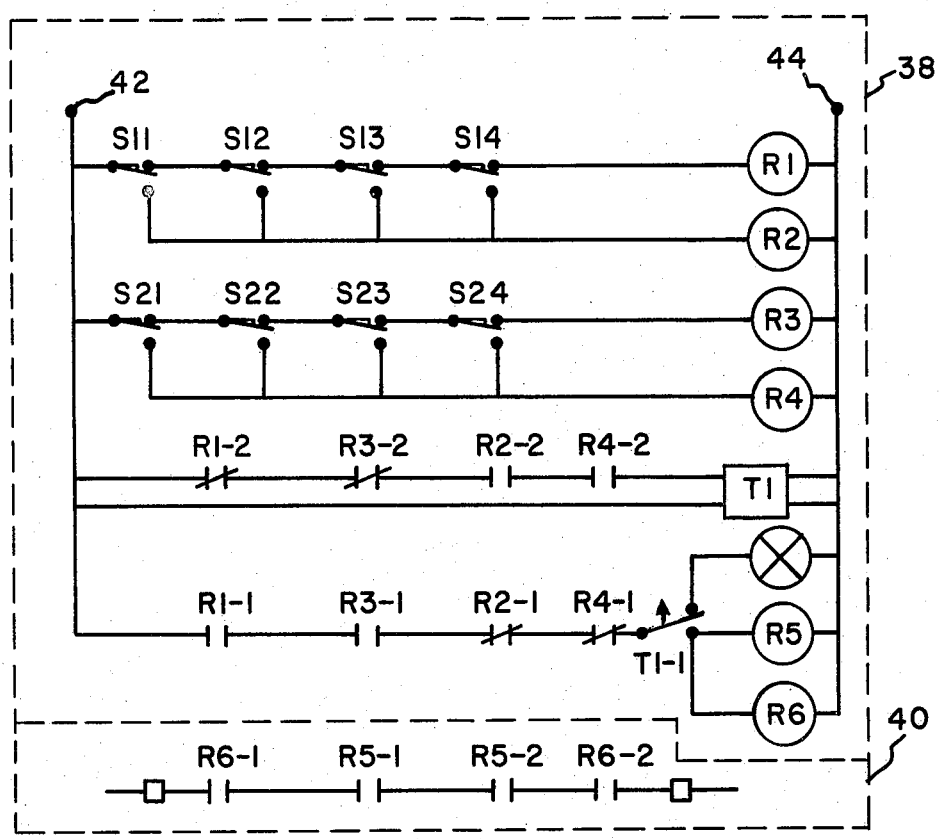
FIG. 3 is a schematic electrical circuit illustrating the interconnection of the safety mat with a main circuit for a power driven machine.

Referring to FIGS. 1 and 2, a safety mat 10 is shown which is adapted to be installed on the floor adjacent a power driven machine in an area where the machine operator or others need to work but which is dangerous when the machine is operating. The safety mat 10 has a base plate 16 with side member 18 and side member 20 connected by end members 26 and 28 to form a shallow box structure for containing supporting plates 30. As shown in FIG. 1, four supporting plates 30 may be positioned in side-by-side relationship for independent vertical movement.

Each of the supporting plates 30 is supported on the base plate 16 by yieldable means such as springs 32. Each of the springs 32 is encased in a housing 34 mounted on one of the supporting plates 30 as by welding and has a ball plunger 36 for engagement with the surface of the base plate 16. The springs 32 urge the ball plungers 36 against the base plate 16 with sufficient force to support the plates 30 in the unloaded condition. The housings 34 provide support members limiting the depression of the plates when the operator or other persons step on the safety mat 10. As shown in FIGS. 1 and 2, the safety mat 10 is covered by a rubber cover 37 adhered to the steel plates 30 to keep them in place and fastened by screws and fastener strips to the side members 18,20 and to the end members 26,28 to keep dirt from penetrating into the inside chamber of the safety mat.

In the embodiment shown, the maximum displacement of the plates 30 is limited to around two millimeters after which the plates, in the fully depressed position, are supported by the housings 34. Each of the plates 30 is engageable by a first switch means such as limit switches S11 and S12, shown in FIG. 1, and S13 and S14 (not shown). Each of the supporting plates 30 is also engageable with a second switch means such as limit switches S21 and S22, shown in FIG. 1, and S23 and S24 (not shown). Preferably the limit switches S11–S14 and S21–S24 are positioned so that when the mat 10 and plates 30 are unloaded the switches will not be actuated; however, when the mat and plates are depressed under a load the switches will be actuated and, in the embodiment shown, the switches have a throw of 1.7 millimeters and are actuated at 1.2 millimeters and then released at 0.8 millimeters from the fully depressed position. As shown in FIGS. 1 and 2, the limit switches S11 through S14 and S21 through S24 are connected to the safety means by suitable conduits leading into the chamber in the side member 20.

Referring to FIG. 3, a safety circuit 38 of the safety means is shown adjacent a main circuit 40 and current from any suitable source is supplied to power supply leads 42 and 44. In the present embodiment the power is 110 volts alternating current.

Limit switches S11, S12, S13 and S14 are connected in series to a first relay R1 and to a second relay R2 so that upon depression of one of the plates 30 one of the limit switches S11–S14 will be actuated to de-energize the first relay R1 and energize the second relay R2. In a similar manner the limit switches S21–S24 are connected in series to a third relay R3 and fourth relay R4 so that upon depression of at least one of the plates 30 one of the switches will be actuated and de-energize third relay R3 and energize fourth relay R4. The first relay R1 and second relay R2 have first contacts R1-1 and R2-1, likewise third relay R3 and fourth relay R4 have first contacts R3-1 and R4-1, all of which are connected in series to a pair of output relays R5 and R6 through a timer switch T1-1.

The first contacts R1-1, R2-1, R3-1 and R4-1 are closed to energize the output relays R5 and R6 when the plates 30 are unloaded in the condition shown in FIG. 3. When one of the plates 30 is depressed as by a person standing on the mat 10, at least one of the limit switches S11–S14 and S21–24 will be actuated and de-energize at least the first relay R1 or third relay R3 and energize at least the second relay R2 or fourth relay R4 so that the output relays R5 and R6 will be de-energized.

As shown in FIG. 3, the main circuit 40 has output contacts R5-1, R5-2 of output relay R5 and output contacts R6-1, R6-2 of output relay R6. These output contacts are normally open and therefore when the output relay R5 and R6 are energized, the output contacts are closed and permit the machine to operate. On the other hand, if one of the output relays R5 or R6 is de-energized, then at least two of the output contacts will be open and the main circuit 40 will be disabled preventing operation of the machine.

As shown in FIG. 3, the first contact R1-1 of first relay R1 is normally open, the first contact R2-1 of second relay R2 is normally closed, the first contact R3-1 of the third relay R3 is normally open, and the first contact R4-1 of the fourth relay R4 is normally closed. The timer switch T1-1 is also normally closed when the machine is operated. It can therefore be seen that when the machine is operating and the output relays R5 and R6 are energized, the main circuit 40 will be enabled by the energization of the normally closed output contacts R5-1, R5-2, R6-1 and R6-2. The normally open contacts R1-1 and R3-1 are closed by energization of the first relay R1 and the third relay R3. The normally closed contacts R2-1 and R4-1 of second relay R2 and fourth relay R4 remain closed because those relays are not energized. This safety system provides a redundant arrangement whereby if any of the switches or relays are defective, the safety means will be actuated and the output relays R5 and R6 de-energized which will open the output contacts R5-1, R5-2, R6-1 and R6-2 to disable the main circuit 40.

For example, each of the steel plates 30 is actuating two of the limit switches S11–S14 and S21–S24 simultaneously when somebody is standing on the safety mat 10. So even if one of the switches fails, the safety function is still provided. Also since each one of the two limit switches actuated by one of the steel plates 30 is energizing and de-energizing a separate relay, the safety system is still operational if one of the relays fails. This is also true of the output relays R5 and R6.

The safety circuit 38 also provides self-checking means to indicate if a component of the safety means has failed. As shown in FIG. 3, a timer relay T1 is connected to the timer switch T1-1 which is normally open when the main circuit 40 is disabled but may be closed when the timer relay T1 is energized. To energize the timer relay T1, the first relay R1, second relay R2, third relay R3 and fourth relay R4 have second contacts R1-2, R2-2, R3-2 and R4-2 which are closed to energize the timer relay for actuating the timer switch when the plates 30 are depressed. Specifically, second contact R1-2 of the first relay R1 and second contact R3-2 of third relay R3 are normally closed and second contacts R2-2 of second relay R2 and R4-2 of fourth relay R4 are normally open. Therefore, upon depression of the mat 10 the second contacts will be closed energizing the timer relay T1 and closing the timer switch T1-1. When the timer relay T1 is no longer energized as by the person stepping off the mat 10, the interval of time during which the timer switch T1-1 is held closed by the timer is started. This may be set at 60 seconds or any other time interval required to give the operator time to start the machine after the main circuit 40 is enabled. Re-energization of the timer relay T1 by stepping onto the mat 10 is required to start the machine within the time interval of the timer switch T1-1. Then first contacts R1-1 and R2-1, R3-1 and R4-1 will be closed energizing output relays R5 and R6 closing output contacts R5-1, R5-2, R6-1 and R6-2 and enabling the main circuit 40 so that the machine may be operated.

In the event a component of the safety means such as switches S11–S14, S21–S24 or relays R1-R4 are defective, the timer relay T1 cannot be energized and the timer switch T1-1 will be in the open position so that when the person steps off the mat 10 the circuit containing the first contacts R1-1, R2-1, R3-1 and R4-1 will not be able to energize the output relays R5 and R6. Instead the current will flow to an indicator such as a light L1 indicating that there is a defect in the system.

It will be understood that the principles of this invention may applied to safety mats having a greater or fewer number of supporting plates and more than one safety means interlocked with the main circuit.

While a certain representative embodiment and details have been shown for the purpose of illustrating the invention, it will be apparent to those skilled in the art that various changes and modifications may be made therein without departing from the spirit or scope of the invention.

We claim:

1. A safety mat for a power driven machine comprising a supporting plate, yieldable means for supporting said plate at a predetermined level in the unloaded condition and permitting depression of said plate when supporting a person, a main circuit for the machine, safety means interlocked with said main circuit disabling operation of the machine if a person is standing on said mat, self-checking means included in said safety means for interrupting said main circuit to prevent operation of the machine when said safety means is defective, said safety means including a switch means activated in response to movement of said supporting plate between unloaded and depressed positions, said switch means being connected to a first relay and a second relay, said first relay being energized when said plate is in the unloaded condition and said second relay being energized when said plate is depressed as by a person standing on said mat, said first relay and said second relay having first contacts which are closed to energize an output relay when said plate is unloaded and which are open to de-energize said output relay when said plate is depressed and said output relay having an output contact in said main circuit for enabling said circuit upon energization of said output relay and disabling said circuit upon de-energization of said output relay, said first relay and said second relay having second contacts which are closed to energize a timer relay for actuating a timer switch when said plate is depressed to provide said self-checking means, wherein prior to starting the machine said timer relay is energized in response to depression of said plate and said timer switch is closed and held in a closed position for a predetermined time interval if a component of said safety means is not defective so that upon return of said plate to the unloaded position there will be energization of said first relay and de-energization of said second relay causing said output relay to be energized and said output contact closed to enable said main circuit so that the machine may be operated and wherein prior to starting the machine said timer relay will not be energized in response to depression of said plate if a component of said safety means is defective so that said timer switch will not be closed preventing energization of said output relay and closing of said output contact so that operation of the machine is prevented.

2. A safety mat in accordance with claim 1 wherein said first relay has a normally open contact and said second relay has a normally closed contact connected to said normally open contact and to said output relay so that when said plate is unloaded said contacts will be closed to energize said output relay and when said plate is depressed said contacts will be open to de-energize said output relay.

3. A safety mat in accordance with claim 1 wherein said first relay has a normally closed timer contact and said second relay has a normally open timer contact connected to said normally open timer contact and to said timer relay so that when said plate is depressed said contacts will be closed and energize said timer relay to close said timer switch.

4. A safety mat in accordance with claim 1 wherein said safety means includes a second switch means actuated in response to movement of said supporting plate between said unloaded and said depressed positions, said second switch means being connected to a third relay and a fourth relay, said third relay being energized when said plate is in the unloaded condition and said fourth relay being energized when said plate is depressed as by a person standing on said mat, said third relay and said fourth relay having third contacts which are connected in series with said first contacts, said third contacts being closed to energize said output relay when said plate is unloaded and said first contacts are closed, and said third contacts being open to de-energize said output relay when said plate is depressed and said first contacts are open.

5. A safety mat in accordance with claim 4 wherein said third relay and said fourth relay have fourth contacts connected in series with said second contacts, said fourth contacts being closed to energize said timer relay when said plate is depressed and said second contacts are closed, and said fourth contacts being open to de-energize said timer relay when said plate is unloaded and said second contacts are open.

6. A safety mat in accordance with claim 5 wherein said safety mat has a plurality of independently suspended plates, each of said plates having said first and second switch means with said first switch means connected in series to said first relay and said second relay, said second switch means being connected in series to said third relay and said fourth relay for energization of said first relay and said third relay when said plates are in the unloaded condition and energization of said second relay and said fourth relay when one of said plates is in the depressed condition.

7. A safety mat in accordance with claim 1 wherein said safety mat includes a base, with said yieldable means comprising springs interposed between said base and said plate and said switch means comprising a limit switch interposed between said base and said plate.

8. A safety mat in accordance with claim 7 wherein said yieldable means includes support members limiting the depression of said plate after actuation of said limit switch.

* * * * *